This invention relates to calculating machines and the like and has particular reference to controls for such machines.

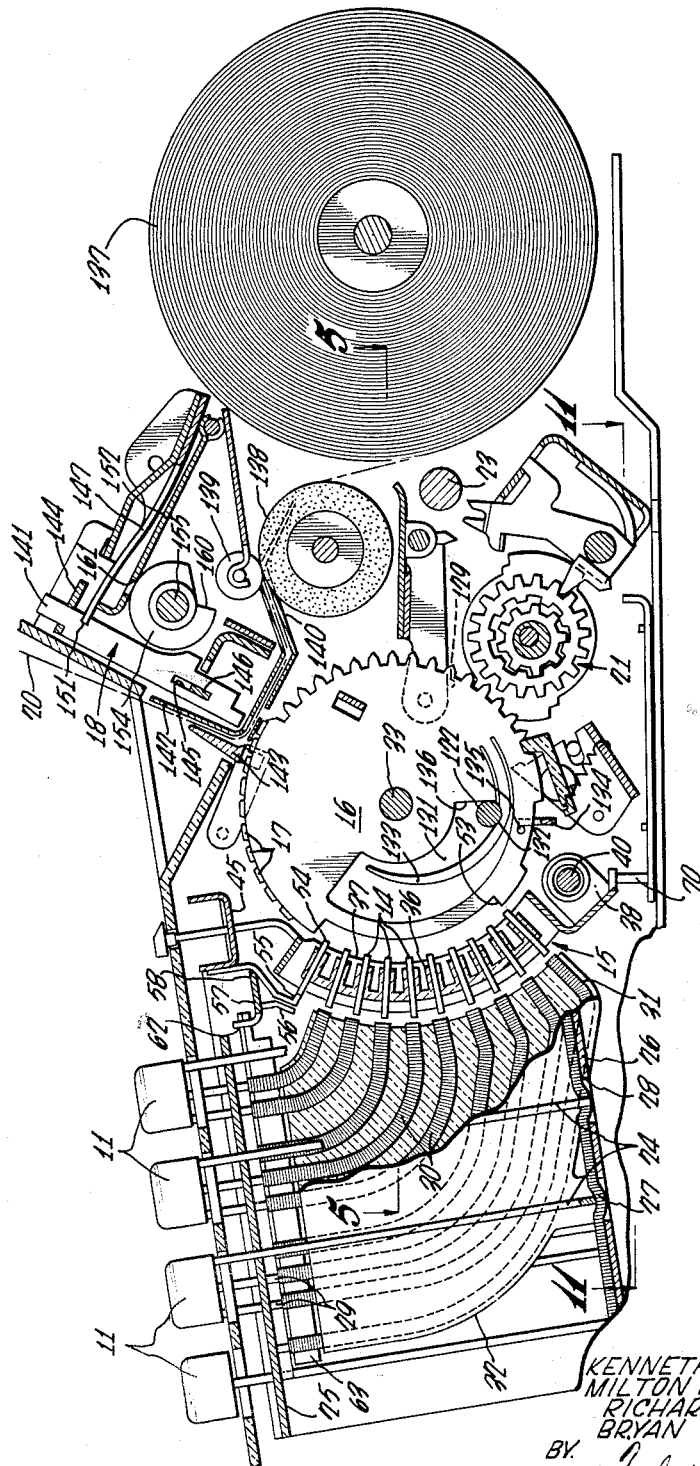

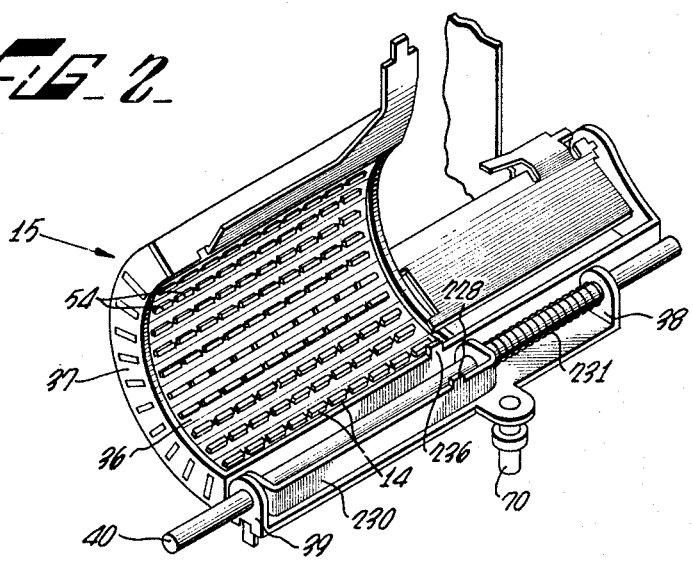
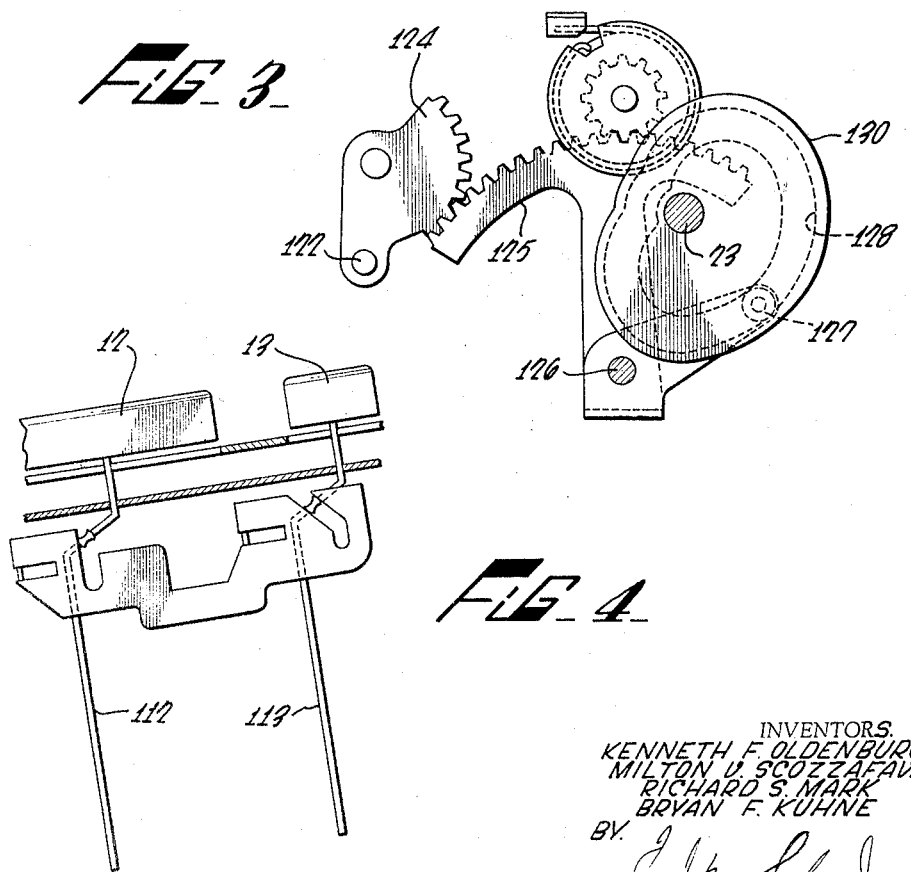

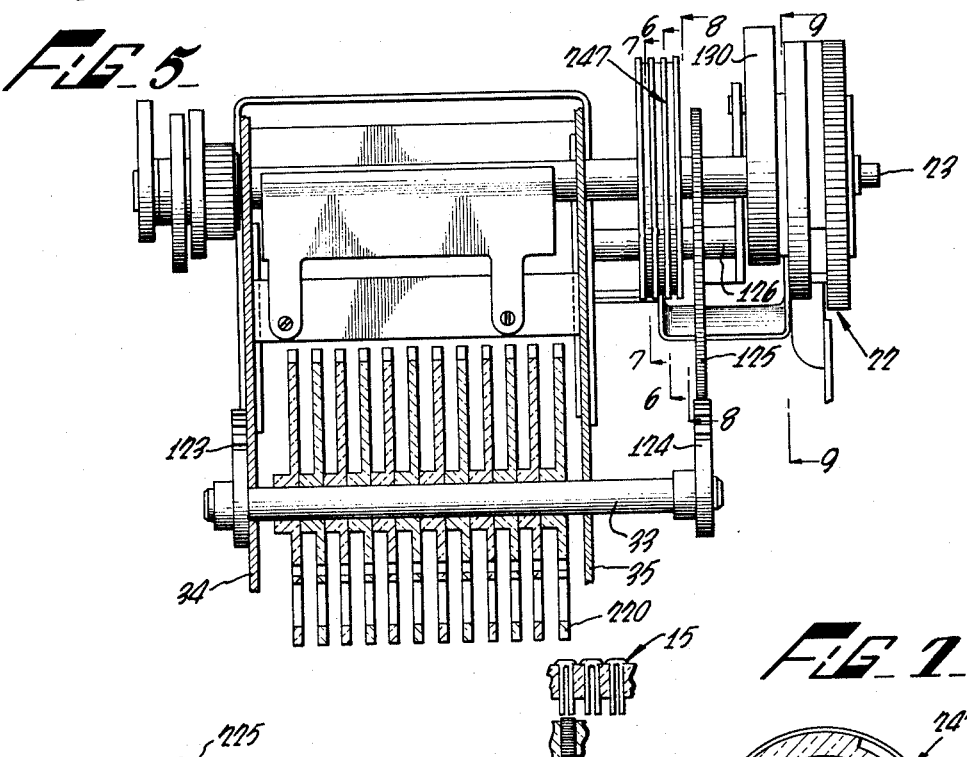
FIG. 5
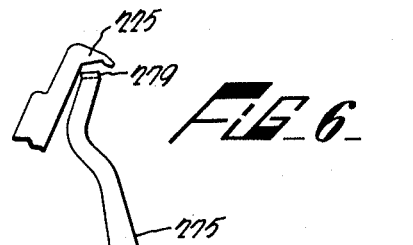
FIG. 6
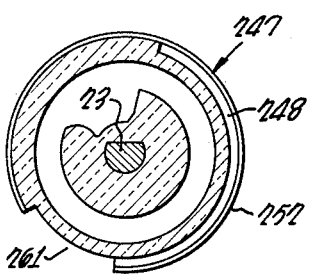
FIG. 7
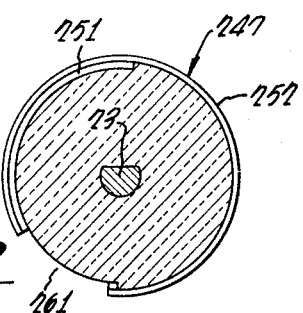
FIG. 8
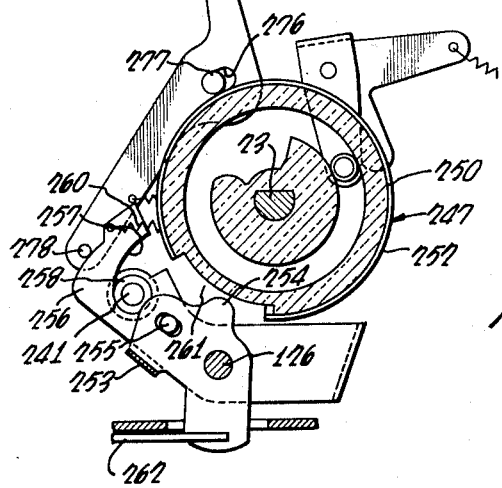
INVENTORS.
KENNETH F. OLDENBURG
MILTON D. SCOZZAFAVA
RICHARD S. MARK
BRYAN F. KUHNE

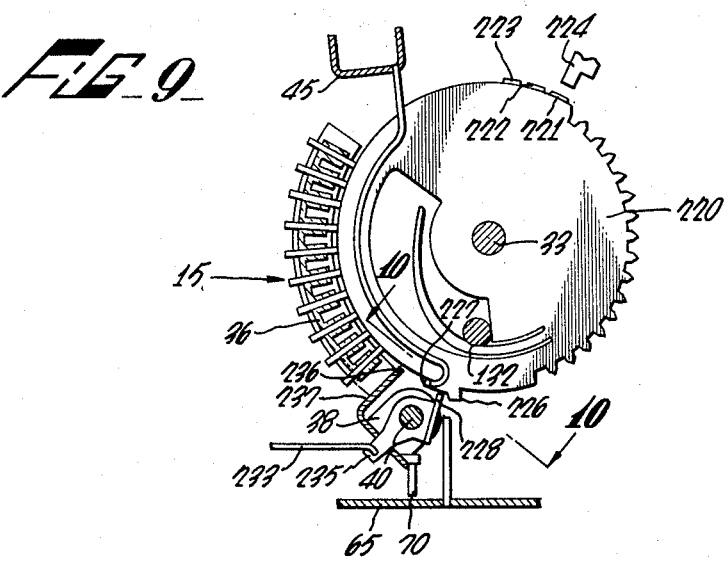
FIG_9_
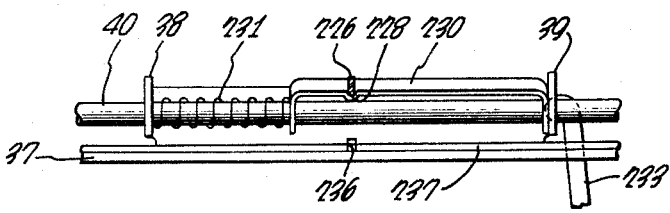
FIG_10_
INVENTORS.
KENNETH F. OLDENBURG
MILTON V. SCOZZAFAVA
RICHARD S. MARK
BRYAN F. KUHNE Dec. 1, 1964 K. F. OLDENBURG ETAL 3,159,338
SYMBOL MEMBER POSITIONING MEANS FOR CALCULATING MACHINE
Original Filed Sept. 25, 1961 5 Sheets-Sheet 5
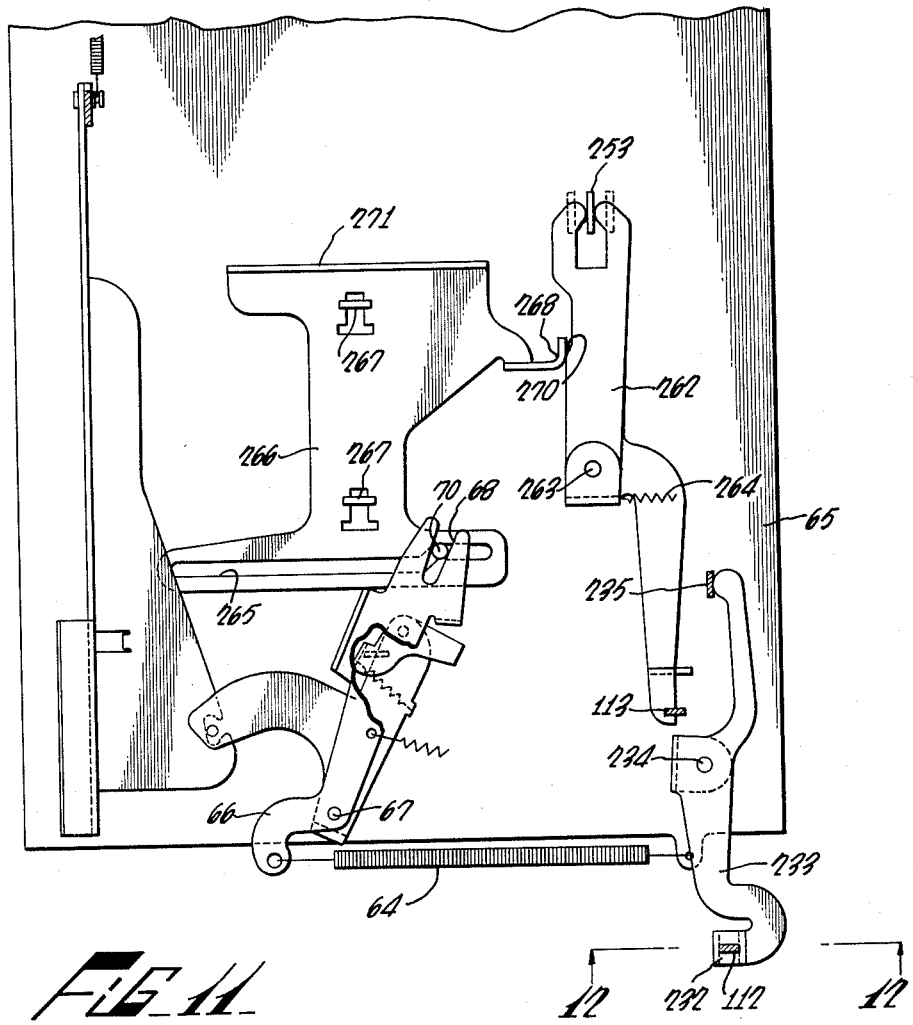
FIG 11
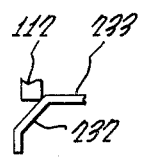
FIG 12
INVENTORS
KENNETH F. OLDENBURG
MILTON V. SCOZZAFAVA
RICHARD S. MARK
BRYAN F. KUHNE
BY 3,159,338
SYMBOL MEMBER POSITIONING MEANS FOR CALCULATING MACHINE
Kenneth F. Oldenburg, Monterey Park, Milton V. Scozzafava and Richard S. Mark, Arcadia, and Bryan F. Kuhne, Monrovia, Calif., assignors, by mesne assignments, to Addmaster Corporation, San Gabriel, Calif., a corporation of California
Original application Sept. 25, 1961, Ser. No. 140,547. Divided and this application Apr. 18, 1963, Ser. No. 279,693
4 Claims. (Cl. 235—60.18)

A principal object of the present invention is to provide a machine of the above type which is highly reliable and yet simple and relatively easy and economical to manufacture and assemble.

Another object is to provide a machine of the above type in which different single parts perform a plurality of functions whereby to reduce the total number of parts and cost of the machine.

A still further object is to provide a simple and effective means to print symbols representing the types of factors and results printed by a listing machine of the above type.

The manner in which the above and other objects are accomplished will be readily understood on reference to the following specification when read in conjunction with the accompanying drawings, wherein:

FIG. 1 is a longitudinal sectional view of an adding-listing machine embodying a preferred form of the present invention.

FIG. 2 is a perspective view of the pin carriage.

FIG. 3 is a sectional view illustrating the sector drive mechanism and is taken substantially along the line 3—3 of FIG. 5.

FIG. 4 is a side view illustrating the add-subtotal and the subtract-total control bars.

FIG. 5 is a sectional plan view illustrating the printing sectors and part of the main drive mechanism and is taken substantially along the line 5—5 of FIG. 1.

FIG. 6 is a sectional view taken along the line 6—6 of FIG. 5 illustrating mainly the accumulator control cam and associated follower.

FIG. 7 is another sectional view through the accumulator control cam and is taken along the line 7—7 of FIG. 5.

FIG. 8 is another sectional view through the accumulator control cam and is taken along the line 8—8 of FIG. 5.

FIG. 9 is a sectional view through the pin carriage illustrating part of the controls for the symbol print sector.

FIG. 10 is a sectional plan view taken along the line 10—10 of FIG. 9.

FIG. 11 is a sectional plan view taken substantially along the line 11—11 of FIG. 1 illustrating part of the accumulator controls.

FIG. 12 is a fragmentary view taken in the direction of the arrow 12 in FIG. 11.

This application is a division of the copending application S.N. 140,547, filed September 25, 1961, for Calculating Machine.

The present invention is disclosed as associated with a ten-key adding-listing machine. However, it should be understood that the same, at least in its broader aspects, could be equally well associated with other types of printing machines of this general class.

Digits of a value are entered into the machine through ten amount keys four of which are shown at 11, which keys range in value from 0 to 9. Operation of the machine to perform digit entry and total or subtotal functions is controlled by an add-subtotal depressible control bar 12 and a subtract-total bar 13 (FIG. 4).

Depression of an amount key sets an appropriate stop pin 14 (FIG. 1) in a pin carriage, generally indicated at 15, which shifts laterally of the machine into cooperative relation with combined differential actuators and printing sectors 16. Each of the latter carries a series of type characters 17 on its periphery, ranging from 0 to 9, the character 0 being located at the clockwisemost location relative to the rest of the series.

The sectors 16 cooperate with a printing mechanism, generally indicated at 18, to print amounts registered by the sectors 16 onto a paper strip 20. The sectors also cooperate with an accumulator, generally indicated at 21, to enter amounts therein or to remove accumulated amounts during totaling and subtotaling operations.

The machine is driven by an electric motor (not shown) through a cyclically operable clutch, generally indicated at 22 (FIG. 5), the clutch being effective to drive a main shaft 23 (FIGS. 1 and 3) one complete revolution during each cycle of operation. The shaft 23 carries various cams, to be described hereinafter, for driving different operating units of the machine in proper timed relation.

The amount keys 11 are mounted on key stems 24 (FIG. 1) which are slideable vertically in slots provided in upper and lower key frame plates 25 and 26, respectively, forming part of the framework of the machine. Tension springs 27 attached at their ends to the lower frame plate 26 extend under the key stems to normally hold the amount keys in raised positions. Such springs extend across openings 28 in the plate 26 to permit depression of the keys.

Each key stem has an extension 29 which is attached to the upper end of a respective flexible cable 30. The various cables are vertically aligned with each other and are slideably mounted for endwise movement in grooves 31 formed in a guide block 32 suitably attached to the lower frame plate 26. The various cables 30 terminate in an arcuate pattern concentric with a shaft 33 which rotatably supports the sectors 16. The shaft is rotatably mounted in bearings formed in side frame plates 34 and 35 (FIG. 5) forming part of the machine framework.

The pin carriage 15 (FIGS. 1, 2 and 9) is formed of an arcuate body 36 of plastic or the like mounted within an enclosing frame 37. The latter is provided with bearing tabs 38 and 39 at its lower end which are slideably mounted on a stationary rod 40 extending across the machine and suitably supported in frame plates 41 and 42 forming part of the machine framework.

It will be noted that the stop pins 14 are arranged in a plurality of vertical columns and are located in horizontal rows aligned with the lower ends of the flexible cables 30. Thus, upon depression of a selected amount key 11, the respective cable 30 will be moved endwise to likewise move an aligned stop pin from its normal ineffective position shown in FIGS. 1 and 2 to a position wherein it forms an abutment in the path of a shoulder 53 formed on an aligned sector 16.

An additional row of escapement pins 54, similar to pins 14, are located above the latter pins. Such pins cooperate with a stop shoulder 55 (FIG. 1) extending downwardly from the channel member 45 to normally maintain the pin carriage in its home or any other denominational position. The pins 54 are aligned with the various vertical columns of pins 14 and are engageable by a finger 56 of a bail 57 which is pivotally supported at 58 in frame plates 60 and 61 forming part of the machine framework for movement about a horizontal axis. The bail 57 is pivotally connected at 62 to a second bail 63 which is pivotally supported for movement about an axis extending longitudinally of the machine. The bail 63 underlies extensions of the amount keys so that upon depression of any thereof the bail will rock bail 57 to depress whichever escapement pin is aligned with the finger 56.

The pin carriage 15 is urged to the left in FIG. 5 by a tension spring 64 (FIG. 11) connected between a part of a bottom frame plate 65 and a lever 66 fulcrumed at 67 on the plate 65 and provided with a slot 68 which embraces a pin 70 depending from the pin carriage. Thus, upon depression of any amount key to set an appropriate stop pin 14, the bails 63 and 57 will depress an aligned escapement pin 54, permitting the pin carriage to escape one column to the next wherein the next escapement pin 54 will arrest against the stop shoulder 55.

The various printing sectors 16 are yieldably driven clockwise from their home positions illustrated in FIG. 1 during digitizing and totaling operations by a bail rod 122. The latter is mounted at its opposite ends on gear sectors 123 and 124 (FIGS. 3 and 5). The sector 124 meshes with a second sector 125 pivoted on a shaft 126 and carrying a roller 127 which engages a cam groove 128 formed in a cam 130 suitably attached to the drive shaft 23.

The bail rod 122 extends through openings 131 in the various sectors 16 and is normally engaged by a detent shoulder 132 formed on a yieldable tail 133 extending integrally with each sector. As the bail rod is rocked clockwise from its home position, it will correspondingly rock the sectors 14 through engagement with the detent shoulders 132 until they strike depressed stop pins 14 in the pin carriage during digit entry operations or until they are arrested by the accumulator during totaling and subtotaling operations, whereupon the detenting shoulders 132 on the tails 133 will yield, permitting the bail rod to proceed to the limit of its excursion.

It should be noted at this time that each sector 16 has a pin 129 thereon which arrests against a stationary comb plate 134 after the sector has advanced 9 increments.

After the printing phase of a machine cycle, the bail rod 122 will be returned by the cam 130 and, in doing so, the frictional engagement between the bail rod and the tails 133 will drive the sectors toward their zero positions.

As noted heretofore, the sectors 16 cooperate with the printing mechanism 18 to print amounts registered by the sectors onto the paper strip 20.

The strip 20 is fed from a supply roll 137, between feed rolls 138 and 139, through a guideway 140 and past a printing station located between the sectors 16 and respective printing hammers 141. From such station, the strip is guided upwardly at substantially 90° over a stationary guide plate 142 and behind a transparent tearoff bar 143. It will be noted that the strip is deflected upwardly in a relatively sharp bend by the tearoff bar.

The hammers 141 are guided for endwise movement at their upper ends in guide slots formed by a cross brace 144 extending between the frame plates 60 and 61. The lower ends of the hammers have slots 145 which are guided over a guide bar 146 also extending between the frame plates 60 and 61.

A leaf spring 147 is secured to the underside of the bar 144 and is formed into a plurality of spring fingers at its forward end, each engaging in a notch 151 in a respective hammer whereby to urge the hammers downwardly toward printing contact with the paper strip. However, the spring fingers are normally prevented from actuating the hammers by a bail 152 pivotally supported on a cross rod 153. The bail 152 overlies a cam 154 carried by a rotatable shaft 155.

During the printing phase of the machine cycle, the shaft 155 is rotated through a complete revolution by suitable means. During such rotation a shoulder 160 on the cam 154 passes one edge of an opening 161 in the bail 152, permitting the spring fingers 150 to impel those hammers 141, which are otherwise allowed to do so, downwardly to effect an imprint of aligned type characters. Immediately thereafter, the cam 154 is effective to retract the hammers to their normal upper positions.

A symbol indicating the type of factor or result printed is produced by a special symbol sector 220 (FIGS. 5 and 9). The latter is rotatably mounted on the shaft 33 and is located to the right of the digit printing sectors 16. The symbol sector 220 is aligned with the left-hand row of stop pins 14 in the pin carriage when the latter is in home position, but is not controlled by these pins since, when such a pin is depressed, the pin carriage is concurrently advanced one step to the left to locate that pin in cooperative relation with the right-hand digit printing sector 16.

The symbol sector has a total symbol type character 221, a subtotal type character 222 and a minus type character 223 thereon, each cooperable with a special printing hammer 224 which is similar in construction to the printing hammers 141 except that it is provided with a special ledge 225 (FIG. 6), the function of which will be described later.

The symbol sector 220 has two abutment shoulders 226 and 227 thereon spaced both angularly and radially relative to each other.

The shoulder 226 is adapted to arrest against a stop projection 228 on a bail slide 230 (see also FIG. 10) when the pin carriage is in its home position and when the bail slide is in its illustrated position relative to the pin carriage. The bail slide is slideable on the rod 40 and is normally held in its position shown in FIG. 10 by a compression spring 231 extending between the slide and the bearing tab 38 of the pin carriage.

When a total operation is initiated, as will be described later, the pin carriage and slide 230 will be in their normal illustrated positions wherein the stop projection 228 is aligned with the symbol sector and accordingly will block the symbol sector in a position to effect an imprint of the total type character 221.

However, when a subtotal operation is initiated, the pin carriage will likewise be in its home position but depression of the add-subtotal bar 12 will have caused its stem 112 (FIGS. 11 and 12) to cam against an inclined edge 232 of a lever 233 fulcrumed at 234, causing its opposite end to engage a foot 235 on the slide 230, causing the latter to move to the left in FIG. 10 relative to the pin carriage so that the symbol sector 220 may advance to a position where the shoulder 227 thereof engages a seecond stop projection 236 on the pin carriage frame 37 (see also FIG. 2). In this position, the subtotal type symbol 222 will be in position to effect a printing impression.

When an add or minus operation is initiated, the pin carriage will obviously be out of its home position whereby both stop projections 228 and 236 will be out of alignment with the symbol sector 220 whereupon the latter will be advanced until the shoulder 226 limits against the edge 237 of the pin carriage frame 37 in which case the minus type character 223 will be located in printing position.

As will be described later, the symbol type hammer 223 is prevented from operating during add operations.

The accumulator is meshed and demeshed with the sectors 16 at different times in a machine cycle depending on whether additive or subtractive entries are being made or whether totaling or subtotaling operations are being performed.

For this purpose, an accumulator control cam 247 (FIGS. 5, 6, 7 and 8) is attached to the main drive shaft 23. Such cam is provided with three axially spaced camways 248, 250 and 251, the camways being separated by broken flanges 252.

A cam follower bail 253 is mounted on the shaft 126 for both pivotal and longitudinal movement thereon. A follower nose 254 is formed on the bail to follow a selected camway. The bail is connected through a pin and slot connection 255 with a camming bail 256 also pivoted on the shaft 126. Bail 256 is provided with spaced arms having camming grooves 257 therein which embrace rollers 258 on opposite ends of the accumulator shaft 241. Accordingly, when the bails 253 and 256 are rocked counterclockwise by a selected camway against the action of a tension spring 260, they will cam the accumulator along suitable guides (not shown) into mesh with the sectors 16.

It will be noted that the flanges 252 are broken at 261 to permit lateral shifting of the follower bail 253 when the machine is in full cycle position.

Means are provided to shift the follower bail 253 into cooperative relation with any of the camways on the cam 247. For this purpose, the bail 253 has a depending leg which is engaged by a bifurcated lever 262 (FIG. 11) pivotally supported at 263 and urged counterclockwise by a tensioned spring 264 tending to locate the nose 254 of the bail 253 in engagement with the camway 248 of the control cam 247. In such case, the accumulator would be meshed with the sectors 16 during the return or counterclockwise rocking movements thereof as occurs during additive entry operations.

Now, the aforementioned stud 70 of the pin carriage is embraced within a slot 265 formed in a blocking plate 266. The latter is slideably mounted for fore and aft movement of the machine on the bottom frame plate 65 through pin and slot connections 267. When the pin carriage is moved into its right-hand or home position, the stud 70 cams the blocking plate forwardly into its position shown in FIG. 11, causing an ear 268 thereof to cam against an inclined edge 270 on the lever 262, thus moving the latter into its neutral illustrated position wherein the cam follower bail 253 is positioned in cooperative relation with a central camway 250. It will be noted on reference to FIG. 6 that the camway 250 has a high portion extending around the major part of its periphery whereby to maintain the accumulator in mesh with the sectors 16 during both the advance and retraction of the latter. This occurs during subtotaling operations of the accumulator.

Thus, when no amount has been entered into the pin carriage, i.e., when the pin carriage is in its home position, and the add-subtotal bar 12 (FIG. 4) is depressed to cause engagement of the clutch 22, a subtotal operation will ensue. However, when a amount has been entered into the pin carriage, i.e., when the latter is moved out of its home position, the blocking plate 266 will be cammed rearwardly of its position shown in FIG. 11 permitting the lever 262 to rock counterclockwise, thus moving the follower bail 253 into cooperative relation with the camway 248.

The stem 113 (FIG. 11) of the subtract-total bar 13 has a camming edge 273 engageable with the forward end of the lever 262 so that upon depression of the bar 13 the lever 262 will be cammed clockwise to position the cam follower bail 253 in cooperative relation with the camway of the cam 247. As shown in FIG. 8, the camway 251 has a sigh portion so located as to mesh the accumulator with the sectors 16 during the early portion of a machine cycle or during advance of the sectors so as to effect a subtractive entry or totaling operation.

Means are provided for preventing printing of a symbol during additive entry operations and for this purpose, a lever 275 (FIG. 6) is provided having a slot 276 pivotally embracing a frame stud 277. A stud 278 on the lever rides on a camming surface formed on the camming bail 256. Normally, the stud 278 engages a low portion of the camming surface on the bail 256 whereby to locate an ear 279 under the ledge 225 of the symbol printing hammer 224, thus blocking the same from printing.

During an add operation, as noted heretofore, the bail 256 will not be rocked counterclockwise from its position shown in FIG. 6 until after the printing operation so that the lever 275 will be effective to block the symbol printing hammer 224 from printing. However, in subtract entry, totaling and subtotaling operations, the camming bail 256 will be rocked counterclockwise during the first portion of a cycle and will be retained there until after the printing operation whereby the high portion of the camming edge of the bail 256 will become effective to hold the lever 275 clockwise, allowing the hammer 224 to operate in the same manner as the remaining hammers.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired is to be secured by United States Letters Patent is:

1. In a calculating machine, a pin carriage having settable pins; means for setting said pins, means for advancing said pin carriage out of home position as an incident to setting a said pin, a differentially movable symbol member, yieldable means for advancing said symbol member from an initial symbol position to a final symbol position, a first stop element for normally maintaining said symbol member in said initial symbol position, a second stop element for differentially limiting advancement of said symbol member to a third symbol position located intermediate said initial and final symbol positions, a depressible function control key, means responsive to depression of said key for rendering said first stop element ineffective, and means responsive to movement of said pin carriage out of said home position for rendering both said stop elements ineffective.

2. In a calculating machine, a pin carriage having settable pins; means for setting said pins, means for advancing said pin carriage out of home position as an incident to setting a said pin, a differentially movable symbol member, yieldable means for advancing said symbol member from an initial symbol position, means for invariably limiting movement of said symbol member to a final symbol position, a first stop element for normally maintaining said symbol member in said initial symbol position, a second stop element for differentially limiting advancement of said symbol member to a third symbol position located intermediate said initial and final symbol positions, a depressible function control key, means responsive to depression of said key for rendering said first stop element ineffective, and means responsive to movement of said pin carriage out of said home position for rendering both said stop elements ineffective.

3. In a calculating machine, a pin carriage having settable pins; means for setting said pins, means for advancing said pin carriage out of home position as an incident to setting a said pin, a differentially movable symbol member, yieldable means for advancing said symbol member from an initial symbol position toward a predetermined symbol position, a first stop element operatively connected to said pin carriage for normally maintaining said symbol member in said initial symbol position when said pin carriage is in said home position only, a second stop element operatively connected to said pin carriage for differentially limiting advancement of said symbol member to a third symbol position intermediate said initial and predetermined symbol positions when said pin carriage is in said home position only, a depressible function control key, and means responsive to depression of said key for rendering said first stop element ineffective, said pin carriage rendering both of said stop elements ineffective upon movement of said pin carriage out of said home position.

4. In a calculating machine, a pin carriage having settable pins; means for setting said pins, means for advancing said pin carriage out of home position as an incident to setting a said pin, a differentially movable symbol member, yieldable means for advancing said symbol member from an initial symbol position to a final symbol position, a first stop element, spring means operatively connected to said pin carriage for normally causing said first stop element to maintain said symbol member in said initial symbol position when said pin carriage is in said home position only, a second stop element carried by said pin carriage for differentially limiting advancement of said symbol member to a third symbol position intermediate said initial and final symbol positions when said pin carriage is in said home position only, a depressible function control key, means responsive to depression of said key for moving said first stop element against said spring means whereby to render said first stop element ineffective, said pin carriage being effective when out of said home position to render both said stop elements ineffective, and means operatively connected to said pin carriage for limiting said symbol member in said final symbol position when said pin carriage is out of said home position.

References Cited in the file of this patent

UNITED STATES PATENTS

| | | |
|---|---|---|
| 2,033,045 | Mehan | Mar. 3, 1936 |
| 2,424,359 | Liljestrom | July 22, 1947 |
| 2,969,176 | Anderson | Jan. 24, 1961 |

FOREIGN PATENTS

| | | |
|---|---|---|
| 809,523 | Great Britain | Feb. 25, 1959 |